(12) United States Patent
Schnock et al.

(10) Patent No.: US 8,602,450 B2
(45) Date of Patent: Dec. 10, 2013

(54) VEHICLE SEAT

(75) Inventors: Jürgen Schnock, München (DE);
Marco Junge, Oberhausen (DE)

(73) Assignee: Faurecia Autositze GmbH (DE)

( * ) Notice: Subject to any disclaimer, the term of this patent is extended or adjusted under 35 U.S.C. 154(b) by 0 days.

(21) Appl. No.: 13/532,219

(22) Filed: Jun. 25, 2012

(65) Prior Publication Data
US 2013/0049417 A1    Feb. 28, 2013

(51) Int. Cl.
*B60R 21/16* (2006.01)

(52) U.S. Cl.
USPC ...................................... 280/730.2

(58) Field of Classification Search
USPC ...................................... 280/730.2
See application file for complete search history.

(56) References Cited

U.S. PATENT DOCUMENTS

| | | | | |
|---|---|---|---|---|
| 6,045,151 A | * | 4/2000 | Wu | 280/728.3 |
| 7,731,226 B2 | * | 6/2010 | Zink | 280/730.2 |
| 7,823,912 B2 | * | 11/2010 | Tracht et al. | 280/730.2 |
| 7,909,359 B2 | * | 3/2011 | Inoue et al. | 280/730.2 |
| 8,136,834 B2 | * | 3/2012 | Fredriksson et al. | 280/730.2 |

* cited by examiner

*Primary Examiner* — Faye M. Fleming
(74) *Attorney, Agent, or Firm* — Robert Becker; Becker & Stachniak PC

(57) ABSTRACT

The invention relates to a vehicle seat, having at least a structural part (2), a cushion body (3), a covering (4) that covers the cushion body. The covering (4) has two covering parts (4a, 4b) connected to one another in a tear seam (10). An airbag module (5) includes an airbag (5a), and an airbag pocket (6) accommodating the airbag module (5), which is attached with its two ends (8a, 8b) in an area of the tear seam (10) to the covering (4) and is provided as a force concentration device for guiding the unfolding airbag toward the tear seam (10). A protective sheet (12) made from a flexible, tear-resistant material is attached between the airbag pocket (6) and the covering (4) for protection of the cushion body (3) from the unfolding airbag (5c).

11 Claims, 1 Drawing Sheet

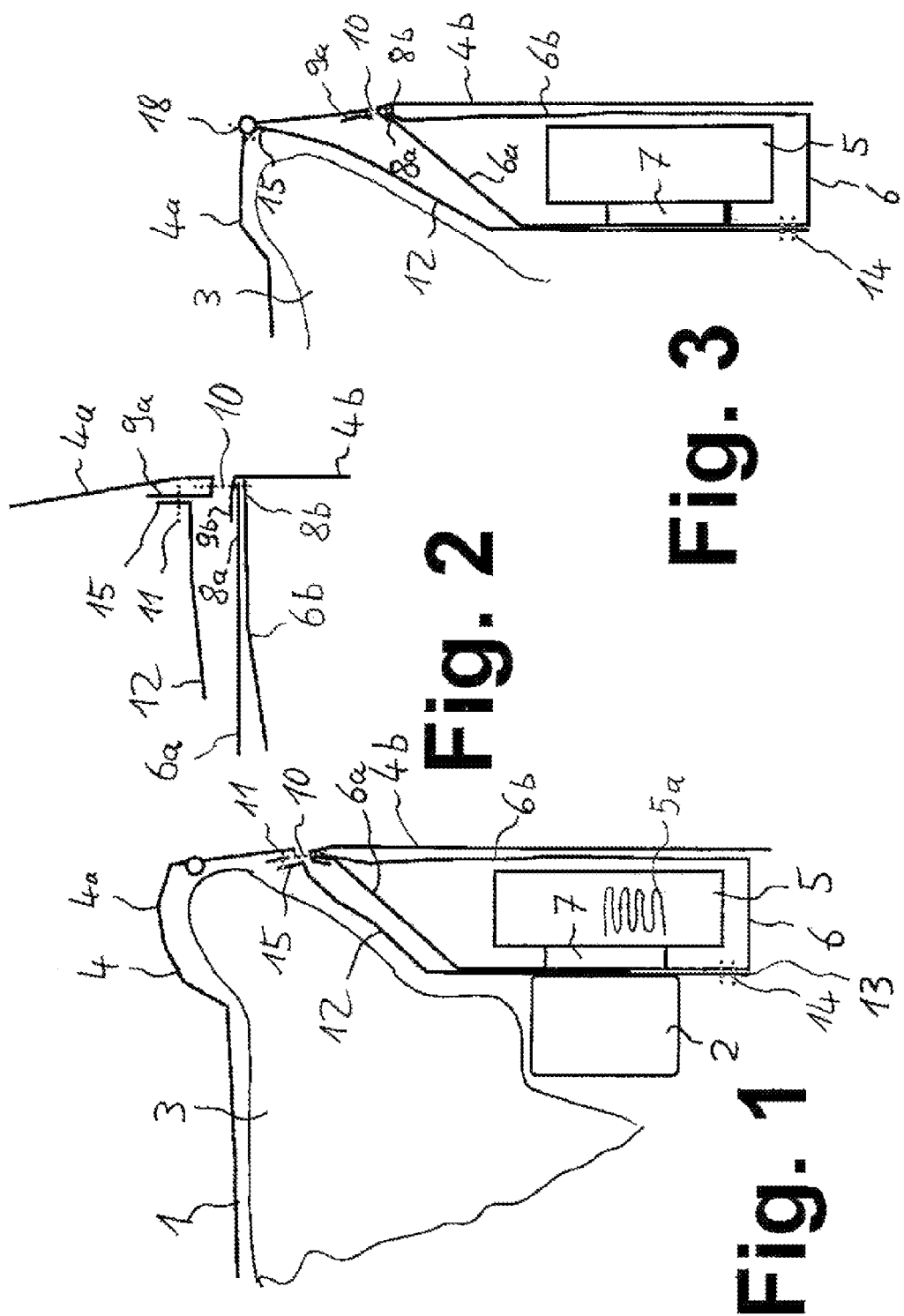

VEHICLE SEAT

The instant application should be granted the priority date of Jun. 25, 2011, the filing date of the corresponding German patent application 10 2011 105 461.1.

BACKGROUND OF THE INVENTION

The invention relates to a vehicle seat with an airbag assembly, which in particular can be provided in the seatback or the seat part.

Airbag assemblies generally have an airbag module, which includes a housing and in the housing, an airbag and a propellant for inflating the airbag. The airbag module generally is rigidly attached to a structural part such as, for example, a backrest rail or seat frame. The airbag module is accommodated in an airbag pocket, which serves as a force concentration device, in order to direct the unfolded airbag specifically to a tear seam in the outer cover of the vehicle seat, such that the airbag tears the cover at this position and unfolds outwardly.

In this connection, it is known to sew the ends of the airbag pocket on the cover in the area of the tear seam. DE 698 09 194 T2 describes an embodiment in which the ends of the protective pocket are sewn with the ends of the cover parts. In this regard, the design of a common tear seam or a tear-seam system is possible. With other systems, both ends of the airbag pocket are sewn.

The tearing process of the tear seam, however, generally is not without problems. Also, when the tear seam tears, the unfolded airbag can be blocked completely or partially by the foam material of the cushion body. The airbag pocket generally lies directly on the cushion body or in the area of the cushion body, so that the unfolding airbag can be blocked by the cushion body. In the event the airbag during its unfolding is blocked too much by the cushion body or moves under the cover of the seat, the unfolding process can be correspondingly blocked.

In order to enable a premature retention of the tear seam, further embodiments of the airbag pocket with tear belts are known, for example from WO 2010/003407 A1. The tear belts partially destroy the tear seam before contact of the airbag, in order to facilitate the further tearing process. Also, in this connection the airbag pocket, however, can release the area adjoining the cushion body, so that the airbag is moved into the material of the cushion body or is blocked by it during unfolding.

SUMMARY OF THE INVENTION

The invention is based on the objective of producing a vehicle seat, which enables a safe unfolding process of the airbag and tearing process of the tear seam and which is manufacturable with relatively minimal expense.

The airbag assembly can be provided in particular in a seat back or also a seat part. The tear seam in particular can be provided in a lateral or laterally forward region of the backrest or the seat part, in particular as lateral impact protection.

Thus, a protective sheet is provided in addition to the airbag pocket. The protective sheet is attached to the cover—preferably with its front ends—in particular sewn, in order to separate the unfolded airbag from the cushion body. The protective sheet in this connection is formed from a tear-resistant, flexible material, in particular a tear-resistant material web.

The invention is based on the idea that an additional protective sheet affects only minimally expenditures in cost and processing, but can effect a significant protection of the cushion body relative to the airbag. The protective sheet is mounted at its preferably forward ends on the cover, such that it protects the cushion body from the unfolding airbag. In this regard, the protective sheet is sewn preferably on the front cover part. The ends of the airbag pocket preferably are sewn on the other cover part, that is behind or laterally thereto, in particular in the tear seam, so that upon ignition of the airbag, the tear seam is destroyed and the path for the unfolding airbag is cleared. The protective sheet then effects a safe separation of the cushion body relative to the airbag.

According to one embodiment, the forward ends of the protective sheet are sewn by means of an auxiliary seam to ends of the front cover part, in particular on the end region of the front cover separated by the tear seam.

Alternatively, the front ends of the protective sheet also can be sewn on the front cover part further spaced from the tear seam, for example in an ornamental seam so that for this attachment, no additional seam is required. The ornamental seam, for example, can be a corded seam, which is provided for sewing on a decorative object such as a plastic tube or other elongated object.

The protective sheet is sewn on its back ends, in particular in a back region of the airbag pocket, in particular behind the airbag module. In this connection, the protective sheet—as well as the airbag pocket—has through-holes for attachment of the airbag module on the structural part and can be sewn with the airbag pocket behind these through-holes.

The inventive system also can be combined with an airbag pocket with tearing belts, which partially destroy the tear seam before contact of the airbag.

BRIEF DESCRIPTION OF THE DRAWINGS

The invention will be explained next with reference to the accompanying drawings of one embodiment. In the drawings:

FIG. 1 shows a section through a rightward side region of a backrest according to a first embodiment;

FIG. 2 shows a detailed enlargement from FIG. 1 with the connection of the protective sheet to the cover part;

FIG. 3 shows an alternative embodiment to that of FIGS. 1 and 2.

DESCRIPTION OF SPECIFIC EMBODIMENTS

FIG. 1 illustrates the right backrest rail 2 of a backrest 1 of a vehicle seat as a structural part. Further, the backrest 1 has a cushion body 3 made of a foam material and a backrest cover 4, which is formed from two cover parts 4a, 4b. The front cover part 4a covers the backrest 1 toward the front. The lateral cover part 4b extends to the right side and if necessary, to the backside of the backrest 1.

An airbag module 5 is accommodated in the backrest 1 or at part of the backrest in an airbag pocket 6 and via attachment means 7, preferably screws or bolts, is attached rigidly to the structural part 2. The airbag pocket 6 has holes for penetration of the attachment means 7. The airbag module 5 has in a typical manner a housing, an airbag (air sack) 5a, and a propellant for inflating the airbag 5a. The airbag pocket 6 is made in the common manner as a folded sheet, in particular a material sheet or textile sheet, from a tear-resistant material and therefore has two layers 6a and 6b, specifically an outer sheet 6b, which rests directly on the cover part 4b, and an inner sheet 6a, which is arranged nearer to the cushion body 3. The sheets 6a, 6b respectively have a front end 8a and 8b, which can be seen in particular from the detailed drawing of FIG. 2.

A protective sheet 12 is formed from a tear-resistant material, preferably a plastic-textile material and is sewn in its back ends 13 in a seam 14 on the back ends of the airbag pocket 6, preferably behind the attachment means 7. The protective sheet 12 extends forwardly from the seam 14 and preferably has a recess for penetration of the attachment means (screw) 7.

According to the embodiment of FIGS. 1, 2, the protective sheet 12 extends in the region of the tear seam 10. By means of the tear seam 10, an end 9a of the front cover part 4a is offset or not under tension and turns over inwardly. The protective sheet 12 is sewn in an auxiliary seam 11 with this end 9a of the front cover part 4a.

According to FIG. 2, the front ends 8a, 8b of both sheets 6a, 6b are folded or placed on one another or also unfolded with the ends (front ends) 9b of the lateral cover part 4b and the sewn in the tear seam 10.

Thus, according to the embodiment of FIGS. 1, 2, the protective sheet 12 is sewn with its front ends 15 with another cover part 4a as the two sheets 6a, 6b.

Upon ignition of the airbag module 5, the unfolding airbag (reference numeral 5a) moves forward between the sheets 6a, 6b toward the tear seam 10. In this manner it tears the tear seam 10, in order to move forward. The connection (actual seam 11) between the cover part 4a and the protective sheet 12 is advantageously not destroyed in this process, so that the unfolding airbag 5a cannot move toward the cushion body 3.

According to the embodiment of FIG. 3, the front end 15 of the protective sheet 12 likewise is connected with the front cover part 4a, however not with its back end 9a or in the area of the tear seam 10, rather spaced from it on an ornamental seam 18, which is formed here as a corded seam or a double-lap seam 18.

With formation as a corded seam 18, an elongated body, for example, a plastic tube, which extends perpendicular, is received in a known manner in cover part 4, in order to form an aesthetically-pleasing structural part when viewed from the front. The embodiment of the corded seam 18 is used accordingly in this embodiment in order to connect the front end 15 of the protective sheet 12. Also the cushion body 3 is thereby protected from the released airbag 5, since the tearing of the tear seam 10 does not destroy the connection between the protective sheet 12 and the front cover part 4a.

The cover parts 4a, 4b, the airbag pocket 6 with its sheets 6a, 6b, and the protective sheet 1 can therefore be formed commonly as the airbag structure or textile assembly, in which they lie on top of one another as sheets and are sewn together in the seams 10, 11, or 10, 18. Then, the airbag module 5 is accommodated in the airbag pocket 6, whereby the cover 4 with the sewn airbag pocket 6 and the protective sheet 12 is placed first roughly over the backrest 1, that is the cushion body 3, the backrest structural part 2 and the further components of the backrest 1. Next, the airbag module 5 is attached to the structural part 2 (backrest rail) by means of the attachment means (screws) and subsequently, the entire backrest cover 4 is pulled completely over the further components of the backrest 1 and trimmed if necessary.

Thus, no substantial additional expense is necessary by using the protective sheet 12.

The specification incorporates by reference the disclosure of German application 10 2011 105 461.1 filed Jun. 25, 2011.

The present invention is, of course, in no way restricted to the specific disclosure of the specification and drawing, but also encompasses any modifications within the scope of the appended claims.

The invention claimed is:

1. A vehicle seat, comprising:
a structural part;
a cushion part;
a covering configured to cover the cushion part, said covering having two covering parts connected at a tear seam;
an airbag module with an airbag;
an airbag pocket accommodating the airbag module, wherein said airbag pocket has two ends and is attached with said two ends in a region of the tear seam to the covering, wherein said airbag pocket is provided as a force concentration device for guiding an unfolding airbag toward the tear seam; and
a protective sheet comprising a flexible, tear-resistant material, wherein said protective sheet is attached between the airbag pocket and the covering for protecting the cushion part from the unfolding airbag, wherein the two ends of the airbag pocket are sewn by means of the tear seam with ends of the covering part.

2. A vehicle seat, comprising:
a structural part;
a cushion part;
a covering configured to cover the cushion part, said covering having two covering parts connected at a tear seam;
an airbag module with an airbag;
an airbag pocket accommodating the airbag module, wherein said airbag pocket has two ends and is attached with said two ends in a region of the tear seam to the covering, wherein said airbag pocket is provided as a force concentration device for guiding an unfolding airbag toward the tear seam; and
a protective sheet comprising a flexible, tear-resistant material, wherein said protective sheet is attached between the airbag pocket and the covering for protecting the cushion part from the unfolding airbag, wherein the airbag pocket is guided in two sheets to the tear seam, wherein the ends of the two sheets are attached to one of said covering parts of the two covering parts, and wherein a front end of the protective sheet is attached to the other of the two covering parts.

3. The vehicle seat according to claim 2, wherein the ends of the airbag pocket are sewn with one of said covering parts that comprises a lateral or back covering part and a front end of the protective sheet is sewn with the other of said covering parts that comprises a front covering part.

4. The vehicle seat according to claim 3, wherein that the front end of the protective sheet is sewn with an end of the front covering part.

5. The vehicle seat according to claim 4, wherein the front end of the protective sheet is sewn with the end of the front covering part in an auxiliary seam, wherein said auxiliary seam is formed in addition to the tear seam, wherein the auxiliary seam is formed on an end of the covering separated or offset by the tear seam from a remaining portion of the front covering part.

6. The vehicle seat according to claim 3, wherein the front end of the protective sheet is attached to the front covering part outside of a region of the tear seam.

7. The vehicle seat according to claim 6, wherein the front end of the protective sheet is sewn to the front covering part in an ornamental seam.

8. The vehicle seat according to claim 7, wherein said ornamental seam is a corded seam for attachment of a decorative element.

9. The vehicle seat of claim 8, wherein said decorative element is a sewn-on plastic tube.

10. The vehicle seat according to claim 3, wherein a back end of the protective sheet is sewn with the airbag seam in a region behind the attachment means for attachment of the airbag module to the structural part.

11. The vehicle seat according to claim 1, wherein the airbag module is mounted in a backrest or a seat part.

* * * * *

UNITED STATES PATENT AND TRADEMARK OFFICE
CERTIFICATE OF CORRECTION

PATENT NO.         : 8,602,450 B2                          Page 1 of 1
APPLICATION NO.    : 13/532219
DATED              : December 10, 2013
INVENTOR(S)        : Jürgen Schnock et al.

It is certified that error appears in the above-identified patent and that said Letters Patent is hereby corrected as shown below:

Title Page, item (30), the "Foreign Application Priority Data" was not included in the patent.

Therefore, applicants respectfully request that a Certificate of Correction be issued showing the Foreign Application Priority Data of DE 10 2011 105 461.1 filed June 25, 2011.

Signed and Sealed this
First Day of April, 2014

Michelle K. Lee
*Deputy Director of the United States Patent and Trademark Office*